United States Patent Office 3,231,376

Patented Jan. 25, 1966

3,231,376

LITHOGRAPHIC PRINTING SURFACE

Jack L. Sorkin, Cleveland Heights, and Daniel C. Thomas, Warrensville Heights, Ohio, assignors to Harris-Intertype Corporation, Cleveland, Ohio, a corporation of Delaware No Drawing. Filed Dec. 9, 1960, Ser. No. 74,780
13 Claims. (Cl. 96—33)

The present invention relates to a lithographic printing surface and, more particularly, to an improved base adapted to receive a light-sensitive layer and form a lithographic plate and to a method of preparing such a base and plate.

In the preparation of a lithographic printing surface, it is known to provide a hydrophilic sub-layer between a backing or support member and a light-sensitive coat. Subsequently, selected areas of the light-sensitive coat are exposed to light, as through a stencil or negative or positive transparency, and the plate then developed in a manner known in the art. In so doing, predetermined areas of the light-sensitive coat are removed, depending on whether a positive or negative working type of light-sensitive agent is used, revealing corresponding underlying areas of the sub-layer. In practice the uncovered portions of the sub-layer form the non-printing areas of the plate and, due to their hydrophilic nature, inhibit scumming and thereby prolong the press life of the resulting lithographic plate.

To perform its functions, it is necessary that the material constituting the sub-layer be not only hydrophilic but non-reactive with the sensitizer, capable of releasing the sensitizer from the non-printing areas while retaining the sensitizer or light-decomposed products thereof in the printing areas, durable in use, and, when the sensitizer or light-sensitive agent is a diazo compound, prevent reaction between a metal support plate and such diazo.

The use of diazo sensitizers, especially those of the negative working type, has become popular in recent years, because a completed "presensitized" plate may be prepared which can be stored in light-tight packages for several months prior to use. At that time the plate is converted to a printing plate or surface by exposure to a light source through a negative, stencil, transparency, or the like, followed by washing with a developer, usually water. However, even presensitized plates have a limited guaranteed storage life which may be as short as six months or less. It is sometimes necessary to store plates for longer periods than this. In particular, printers who purchase in relatively large quantities must store some plates for relatively long periods of time prior to use and therefore cannot always use the presensitized type of plate.

For such printers, a plate is prepared having a desired hydrophilic sub-layer but lacking an overlying light-sensitive coat. At the time of use, the printer merely swabs or wipes on a solution of a sensitizer and dries the plate which is then ready for exposure. Accordingly, such plates having only a sub-layer are known in the art as "wipe-on" plates. However, since the hydrophilic layer is exposed in such a plate and is not protected by an overlying layer of a sensitizer, as in the case of a presensitized plate, the sub-layer deteriorates in time and loses its hydrophilic character. Consequently, even in the case of presently known wipe-on plates, there is a time limitation as to use.

It is, therefore, a principal object of the present invention to provide an improved lithographic printing surface and a process for preparing it.

Another object is to provide a lithographic plate having an improved sub-layer.

A further object is to provide a substantially permanently hydrophilic sub-layer, particularly adapted for use with wipe-on plates.

A still further object is to provide a lithographic plate having a sub-layer formed from an organo-titanate or organo-zirconate.

A still further object is to provide a lithographic plate having a metal surface and a sub-layer formed from an organo-titanate or organo-zirconate chemically reacted therewith.

Other objects will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

In general, a plate for lithographic printing may be prepared in accordance with the present invention by treating a metal-surfaced support member to activate chemically such surface, reacting the surface so treated with certain organo-titanates or organo-zirconates, and then hydrolyzing such metal ester short of conversion to the metal oxide. The resulting sub-layer, formed from the titanate or zirconate, in chemical union with the metal-surfaced support member may be used as a wipe-on plate, or if a presensitized plate is desired, a film or coat of a light-sensitive diazo compound may be applied over the sub-layer when so united with a metal-surfaced member. In any event, a layer of some sensitizer is ultimately applied over the sub-layer which is then exposed to light through a stencil and developed in a manner known in the art to prepare finally the printing surface.

In preparing the present plates, metals suitable for lithography, such as aluminum and zinc may be used as the surface of the support member. It is important in the present invention to condition the metal surface of the support member so as to provide reactive groups for subsequent reaction with the organo-titanate or zirconate. Surfaces rich in hydroxyl groups especially produce a very tightly bound hydrophilic layer. The hydroxyl groups may be added to the metal surface of a plate by treatment with various agents. It has not been possible to determine in what manner the hydroxyl groups attach themselves to the metal surface. It may be that a hydroxide is merely formed, for example, aluminum hydroxide in the case of an aluminum surface. It has also been postulated that the metal becomes oxidized and that the oxide then becomes hydrated, such that the reaction with the titanate takes place through the hydroxyl group of the hydrate of the oxide. The addition of hydroxyl groups to a metal surface, whatever the mechanism may be, is intended to be included here and in the claims by the term "hydroxylation." The materials employed to apply the hydroxyl groups are likewise intended to be included here and in the claims by the term "hydroxylating agent."

Among the hydroxylating agents that may be used are the relatively strong inorganic bases such as sodium hydroxide and potassium hydroxide as well as ammonium hydroxide. The latter is preferred since the ammonia cation is driven off during drying of the plate. The alkali metal bases should be used in relatively dilute aqueous solution of the order of 0.05 to 3.0 percent by weight so as not to dissolve the metal rather than treat it as desired. Also because of the strength of these bases, treatment of the metal surface can be carried out at room temperatures (70° F. to 80° F., approximately). To hydroxylate a metal surface, the metal support member is merely submerged into the aqueous alkali metal base solution for approximately one to three minutes and then dried. Stronger base solutions, for example up to 5 percent by weight, can also be used with correspondingly less exposure time. Ammonium hydroxide may be used in the same concentrations, but the treatment time is somewhat longer, for example from about 5 to about 12 minutes, and the temperatures somewhat higher, for instance, 50° C. to 70° C.

Amino-hydroxy compounds such as ethanolamine, diethanolamine and triethanolamine may also be used as hydroxylating agents, again by dipping a plate into an aqueous solution of such compounds. Since the amino-hydroxy compounds do not hydroxylate the metal as readily as the alkali metal bases, it is preferred to carry out the treatment at more elevated temperatures, for example, from about 50° C. to about 70° C., and for somewhat longer periods of time, that is, from about three to about ten minutes. The aqueous solution may contain from about 1 to about 10 percent by weight of the amino-hydroxy compounds.

Water has also been used as a hydroxylating agent. In this case the water should be boiling and the plate dipped for about five to about fifteen minutes. Strong oxidizers in the presence of water can also serve as hydroxylating agents, for example, hydrogen peroxide, potassium permanganate, chromic acid, and the like. A solution comprising sodium fluoride, sodium aluminate, and sodium hydroxide as disclosed in U.S. Patent No. 2,811,426, which is hereby incorporated by reference, may also be used to hydroxylate a metal surface, particularly aluminum.

The organo-titanates used in accordance with the present invention are those having the formula, $(RO)_4M$, wherein R is a monovalent hydrocarbon radical selected from the group consisting of aryl radicals, such as phenyl, tolyl, xylyl; and all aliphatic radicals of one to eight carbon atoms, including alkyl, isoalkyl, alkylene, isoalkylene, alkenyl, isoalkenyl radicals, that is, without regard to degree of saturation or spatial isomerism; and wherein M is a metal selected from the group consisting of titanium and zirconium. Such compounds are commonly referred to as metal ortho esters and also as alcoholates or phenylates. The tetraalkyl metal esters are preferred and of these tetraisopropyl titanate has been found to be best.

The manner of preparing these materials, hereinafter referred to as metal esters, is known in the art. Reference is made, for example, to United States Patent No. 2,187,821 which is hereby incorporated by reference. As described, one method of preparation comprises, for instance, reacting an alcohol with a halide, preferably the chloride, of titanium in the presence of ammonia.

The esters of the indicated group are applied to a plate in any convenient organic solvent. It will be appreciated that the organic solvents play no critical part in practicing the invention and therefore can vary widely in nature. Aromatic solvents such as benzene, toluene, and xylene may be used; also solvents such as acetone, methyl-ethyl ketone, tetrahydrofurane, and the chlorinated hydrocarbons may be employed. But a preferred solvent comprises the humectants or hygroscopic solvents for a reason hereinafter noted. The humectant solvents include, for example, the anhydrous or substantially anhydrous alcohols, such as methyl, ethyl, propyl, isopropyl, butyl, and isobutyl alcohols, ethylene glycol, diethylene glycol, glycerol, Cellosolve, Cellosolve acetate, Cellosolve butylate, methyl Cellosolve, butyl Cellosolve, Carbitol, butyl Carbitol, and the like.

Following the application of the metal ester solution, which may be by dipping, spraying, roller coating, whirling, etc., the plate is merely dried to drive off the solvent and deposit the metal ester as a sub-layer. Infrared lamps may be used to speed this step, for example, by heating to about 150° C. to about 180° C. for about four to about seven minutes. At least at the interface between the metal surface and the resulting sub-layer there is a chemical reaction with the hydroxyl groups to form as a reaction product a metal titanate or zirconate, for example, aluminum titanate. This reaction serves to bond the sub-layer tightly to the metal support member.

Wtihout intending to limit the invention, it is theorized that the following reaction is one of several which may take place between a metal surface, such as aluminum, which has been treated as described and an ester as defined, using a titanate as an example:

$$\text{(I)}\quad Al(OH)_3+Ti(OR)_4+3H_2O = Al(OH)_2{-}O{-}Ti(OH)_3+4ROH$$

The titanium compound so formed may undergo still further reaction as in:

(II)

$$Al(OH)_2{-}O{-}Ti(OH)_3 + Ti(OR)_4 + 3H_2O = \begin{array}{l} Al(OH)_2OTi(OH) \\ \qquad\qquad\quad | \\ \qquad\qquad\quad O{-}Ti(OH)_3 \end{array} + 4ROH$$

or the same titanium compound may undergo the following reaction depending on whether more of the metal ester reacts with such previously formed titanium compound:

(III)

$$Al(OH)_2{-}O{-}Ti(OH)_3 + Ti(OR)_4 + 3H_2O = \begin{array}{c} (HO)_3Ti{-}O{-}Al{-}O{-}Ti(OH)_3 \\ | \\ OH \end{array} + 4ROH$$

In any event, it is emphasized that a titanate is formed in which one or more of the R groups of the metal ester are replaced by an atom of the metal of the plate, that is, such atom is linked to the titanate through an oxygen atom. For example, it is postulated that this reaction may also take place:

$$\text{(IV)}\quad 4Al(OH)_3+3Ti(OR)_4=Al_4(TiO_4)_3+12ROH$$

Similarly, other titanates or zirconates or interreaction between various titanates or zirconates can result. If desired, titanates and zirconates can be used in combination.

The metal ester alone can serve as a sub-layer, but naturally it is difficult if not impossible to gauge the exact amount of metal ester needed for such a reaction. As a practical matter some excess metal ester is usually present. In fact, where a relatively thick sub-layer is desired, an excess of the ester within the limitations hereinafter mentioned is not objectionable.

The metal esters herein defined hydrolyze readily and absorb moisture from the air for this purpose if none is otherwise available. Accordingly, the hydration may be positively promoted by insuring a supply of water, or the hydration may be permissible, that is, allowed to be effected by the moisture in the atmosphere. The hydrolysis mechanism is thought to involve the formation of an intermediate complex between the metal ester and the water. The hydroxy ester cannot be isolated since it immediately reacts to give a dimer. The hydrolysis of the titanate or zirconate proceeds in a stepwise fashion, if not otherwise prevented, until a clear amorphous film of the oxide forms. It has been found that the presence of the oxide, titania or zirconia, is detrimental for lithographic purposes. These metal oxides do not make an acceptable sub-layer. Not only do titania and zirconia fail to provide the necessary hydrophilic character, but the whitish powder of the oxide flakes free of the plate resulting in "pinholes" in the prints. While the whitish powder referred to is primarily the oxide of either titanium or zirconium, other related titania and zirconia hydration end products may also be present. All of such material which tends to flake free of the plate is objectionable for that very reason, namely, that flaking produces inferior plates.

To prevent the formation of titania and zirconia and related end products, we propagate the reaction with the metal continuing to interreact the titanate or zirconate during its hydrolysis to build large polymeric molecules effective to resist complete hydrolysis to the metal oxide and like flaking end products. This may be accomplished by heat if necessary, the upper limit being determined by the materials themselves, that is, short of charring the organic material, or annealing the metal of the support member.

Because of the "race" between the lower portion of the metal ester sub-layer (that is, that portion immediately adjacent the metal surface) to interreact to a sufficient polymeric state effective to inhibit hydrolyzation to the metal oxide, and the upper portion of the sub-layer which does hydrolyze to the oxide, there is indirectly a limitation as to the amount of metal ester which can be applied from the organic solvent. Preferably a relatively thin sub-layer is deposited which can be reacted with the metal and polymerized as described without forming the metal oxide. Organic solvents containing about 0.1 percent to about 10 percent by weight of the metal ester are acceptable. When solutions of greater amounts are used, a white cloudy precipitate of the metal oxide is apt to form on the exposed surface of the sub-layer which can rub off. Where the precipitate remains, it poorly retains an overcoat of the sensitizer and often the sensitizer as well breaks away. However, even in this case, if the plate is washed with a solvent, such as isopropanol, after deposition of a metal ester from a solvent bearing in excess of 10 percent by weight, a sufficient amount of the ester can be flushed away to place the actual deposition of the metal ester within a range which permits hydrolysis with polymerization to a state short of hydrolysis to the oxide as described.

In the equations previously given, such as Equation I, it will be noted that the presence of water aids in promoting the reaction and therefore a hygroscopic or humectant solvent can be advantageously employed, that is, a solvent that is sufficiently hygroscopic to absorb moisture from an ambient atmosphere. This action supplies a ready source of water for the hydrolysis reaction and literally "boosts" the hydrolysis. When the solvent employed is not a humectant, as in the case of toluene, the solvent must first be substantially removed after deposition on a plate before the hydrolysis of the metal ester can take place, thus unnecessarily prolonging the deposition of the metal oxide.

The light-sensitive agent or sensitizer employed may be any of those previously known to the art, the present invention residing in the material constituting the sub-layer and not being critically related to any particular light-sensitive agent used. For example, commonly known tannable colloids and tanning agents may be used. These include bichromated albumin, casein, gum arabic, gelatin, glue, a copolymer of polyvinyl-methyl-ether and maleic anhydride, and the like. In all of such cases, as is understood in the art, hexavalent chromium ions chemically react with the companion material, such as casein, under the action of light to alter the water-solubility of the coating and delineate printing and non-printing areas of the plate. This action of the chromium ion is thus well known in the art and may be provided by adding ammonium chromate or dichromate, sodium chromate or dichromate, potassium chromate or dichromate, and the like. In addition to these, certain organic chromates and dichromates may also be used. For example, the reaction product of a quaternary ammonium hydroxide and chromic acid, or ethylene diamine and chromic acid or a soluble dichromate may be employed. Such organic materials may be advantageous in that they show less tendency to crystallize and therefore produce a more uniform sensitized coating.

A diazo compound may also be employed as the light-sensitive agent. It is emphasized that the nature of the diazo material is not critical to the practice of the invention, it being understood that the present sub-layer materials do not enter chemically into the reactions of a light-sensitive diazo compound when triggered by light. Accordingly, the light-sensitive diazo or diazide may be either of the coupling or non-coupling types or of the positive or negative working types.

Descriptions of the various diazo sensitizers which may be used are set forth in the following United States patents which are hereby incorporated by reference: Nos. 2,063,631; 2,100,063; 2,667,415; 2,679,498; 2,692,827; 2,772,972; and 2,778,735.

A method of preparing a very satisfactory diazo is described in Patent No. 2,679,498, and in Patent No. 2,100,063. This compound is a condensation product of paraformaldehyde with p-diazo-diphenylamine sulfate. Upon exposure to light, such as ultra-violet light, this type of light-sensitive diazo compound expels nitrogen from the molecule and forms a water-insoluble, hydrophobic and oleophilic material which then becomes the printing image. The unexposed portions of the compound are readily washed away by known developer solutions, usually water.

As used herein and in the claims the term "light-sensitive agent" is taken to mean either a light-sensitive diazo compound of the types just described, or a light-sensitive agent consisting of both a chromium component and the material used in combination therewith such as gum arabic or any of the previously noted materials.

The light-sensitive agent may be applied over the sub-layer in a conventional manner as by roller coating, dipping, spraying, and the like. A sufficient amount should be used to cover the entire sub-base. The light-sensitive tanning agents form an image when exposed to light in accordance with techniques of lithographic operation. Negative-working diazo compounds are usually applied from an aqueous solution, while positive working diazos are usually applied from organic solvent as is known in the art. The thickness of the diazo film is not critical, a residue of about 0.003 gram per square foot of plate being an accepted practice. Aqueous solutions of up to about two percent diazo compound have also been employed.

If desired, the manufacturer of a lithographic plate of the present invention can stop short of the application of the light-sensitive agent, so that a wipe-on plate having only the sub-layer can be shipped to a printer.

It will be noted that the wipe-on plate is easily prepared by a single dip of the hydroxylated plate into a solution of the present metal esters. Further, a plate prepared as herein described can be employed for direct image use, for example, in a typewriter using a "Multilith Master" type of typewriter ribbon known in the art.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

*Example I*

An aluminum sheet is treated for about 1.5 to 3.5 minutes at about 150° F. to about 212° F. in an aqueous bath having the following composition in weight percent:

| | Percent |
|---|---|
| NaF | 0.5 to 4 |
| $NaAlO_2$ | 0.025 to 1 |
| NaOH | 0.1 to 0.2 |

The plate may next be rinsed with water and then treated for about 2 to 5 minutes at about 70° to 90° C. in an aqueous bath having this composition in weight percent:

| | Percent |
|---|---|
| $HNO_3$ | 8.0 to 10.0 |
| $CrO_3$ | 0.4 to 1.5 |

The plate is again rinsed and then dried, after which the plate is dipped into a one percent solution of tetra-isopropyl titanate in isopropanol. The solution is maintained at room temperature and the plate remains immersed for about five minutes. The plate is then dried under infrared lamps, at a maximum temperature of about 150° C., and then dipped into a two percent aqueous solution of Fairmount's Diazo Resin No. 4 (a condensation product of paraformaldehyde with p-diazodiphenylamine sulfate). The plate is allowed to dry at room temperature and then exposed through a suitable negative for 30 lux units generated from carbon arcs. The plate is then washed with water to remove the non-exposed diazo, desensitized, and inked in the usual manner. After 30,000 prints were produced, this plate was still in good condition.

*Example II*

A direct image plate is prepared by following the procedure of Example I through the deposition of tetraisopropyl titanate and subsequent drying. The plate is then placed in a typewriter and struck with the typewriter keys through a "Multilith Master" typewriter ribbon.

*Example III*

A procedure is carried out like the procedure of Example I except that instead of the etching bath, the plate is treated by being dipped into a hot 2.8 percent ammonium hydroxide bath for about three minutes and then by being baked at about 180° C. for five minutes. This is followed by application of a 0.8 percent ethyl alcohol solution of tetraethyl titanate. After drying with infrared lamps, a bichromated colloidal dispersion of albumin is then applied over the deposited titanate sub-base, and the plate is then whirled until dry.

*Example IV*

An aluminum plate is treated with a 20 percent aqueous solution of trisodium phosphate for three minutes at 70° C. The plate is then rinsed with water at an ambient temperature for two minutes and next desmutted with a 70 percent aqueous solution of nitric acid for an additional two minutes. The plate is further rinsed in tap water for two minutes followed by a deionized water rinse for an additional minute. Thereafter the plate is dipped into a 2 percent aqueous solution of ethanolamine maintained at 70° C. The plate is held within this solution for ten minutes and then removed and given a two minute tap water rinse followed by another desmutting operation with a weaker 5 percent aqueous solution of nitric acid. The plate is again rinsed with water and then dried under infrared lamps at 70° C. for five minutes.

The plate is now dipped in a 5 percent solution of tetraoctyl titanate in isopropanol for about one minute and then again dried under the infrared lamps at 70° C. for about five minutes. Finally, the plate is dipped into a one percent aqueous solution of the condensation product of paraformaldehyde with p-diazo-diphenylamine sulfate for one minute and then allowed to air dry. The plate is now ready for exposure.

*Example V*

A zinc plate is boiled in deionized water for ten minutes and then dipped into a 1.5 percent solution of tetraisopropyl titanate in anhydrous ethylene glycol. The plate is then allowed to drain and simultaneously warmed until substantially dry, leaving a minute quantity of glycol behind to act as a humectant. At least the exposed surface of the titanate deposited is now hydrolyzed. An aqueous dispersion of bichromated casein is now blade coated over the resulting sub-base to sensitive the plate which is then finally air dried. The plate is now ready for exposure.

*Example VI*

A zinc plate is dipped into a hot three percent ammonium hydroxide bath for about three minutes and then baked at 150° C. for about seven minutes. The plate is then treated with a one percent solution of tetraisopropyl titanate in methyl alcohol. The plate is heated below 125° C. to drive off the alcohol and interreact the titanate with the hydroxyl groups on the plate. Simultaneously, the titanate hydrolyzes from the moisture of the air and interreacts to a polymeric state, thus inhibiting formation of titania. A bichromated gelatin colloidal dispersion is applied over the resulting hydrophilic surface in an amount to cover it and form a film of suitable thickness for lithographic reproduction techniques.

*Example VII*

A clean aluminum plate is held in a 3 percent aqueous solution of triethanolamine for 10 minutes at 60° C., then coated with a 1.2 percent solution of tetraoctyl titanate in toluene, and finally dried under infrared lamps. Reaction of the titanate with the plate with simultaneous hydrolysis from the ambient atmosphere deposits a sublayer over the plate. A bichromated gum arabic colloidal dispersion is finally applied as an overcoat, and the plate is again dried. Drying may be hastened by forcing air over the plate as by a fan.

*Example VIII*

A sheet of aluminum is cleaned in the manner described in Example IV and then dipped into a 0.1 percent aqueous solution of sodium hydroxide for 1 minute. The plate is then washed with water and dried under infrared lamps. The plate so prepared is now dipped into a 0.5 percent solution of tetraisopropyl titanate for 1 minute and again dried under the infrared lamps. A sensitizer is applied by now coating the plate with a bichromated gum arabic colloidal dispersion.

*Example IX*

A sheet of aluminum is cleaned in the manner described in Example IV. The plate is now dipped for 2 minutes in a 5 percent aqueous solution of potassium hydroxide and then rinsed with tap water. If desmutting is desired the plate is then briefly washed with a concentrated solution of nitric acid and allowed to dry. A sublayer is formed by dipping the plate so prepared in a 1 percent solution of tetraisopropyl titanate for about 2 minutes and then dried under infrared lamps. A sensitizer is next applied by coating the sub-layer with a 0.5 percent aqueous solution of a light-sensitive diazo compound and then whirling the plate.

*Example X*

A zinc plate is cleaned by immersion in an aqueous acid solution containing 250 ml. of sulfuric acid (95% concentration) and 25 ml. of nitric acid (40% concentration) per gallon of water. After the plate has been flushed with water to remove any remaining acid, the plate is further immersed in boiling deionized water for ten minutes. Following a water flush of the treated surface, it is dried under infrared lamps. The plate is then dipped for two minutes into benzene containing one percent by weight of tetraisopropyl titanate. Following a further water flush, and after hydrolysis of the tetraisopropyl titanate in the manner described, a sensitizer was applied by roller coating the plate with an aqueous solution containing two percent by weight of a light-sensitive diazo compound and 0.5 percent by weight of zinc chloride.

*Example XI*

A procedure was carried out like the procedure of Example X except that the metal ester used consisted essentially of a xylene solution containing one percent by weight of tetra-n-octyl zirconate. After infrared drying the sub-layer with a simultaneous hydration a sensitizer was applied by coating the plate with an aqueous solution containing two percent by weight of a condensation product of paraformaldehyde with p-diazo-diphenylamine sulfate. The plate was then exposed, developed in the usual manner, and placed on a press for printing.

*Example XII*

An aluminum plate was cleaned and etched by treatment at 70° C. for three minutes with a 20 percent aqueous solution of trisodium phosphate. The plate was then spray rinsed with tap water for two minutes at room temperature and then desmutted by dipping for two minutes in a 70 percent aqueous solution of nitric acid at room temperature. Following a further spray rinse with tap water for two minutes and a preferred rinse with deionized water, the plate was immersed in boiling deionized water for three minutes and then heated under infrared lamps for an additional five minutes. A sub-layer was next applied by dipping the plate into isopropanol containing one percent by weight of tetra-n-octyl zirconate. The plate was next successively rinsed in tap water and then deionized water for about three minutes. The plate so prepared was used as a wipe-on plate but if desired any of the disclosed sensitizers could have been applied to the resulting sub-layer.

All of the foregoing plates can be exposed to light through a stencil, transparency, or negative to react selected areas of the light-sensitive agent and thereby form printing and non-printing or hydrophilic areas in a manner known in the art. Certain areas of the light-sensitive coat are subsequently removed to reveal the underlying hydrophilic sub-layer of the present invention.

As used herein, the term "hydrophilic" means sufficiently water-attractive or water-loving to be attractive to water and/or repellent to ink for lithographic printing purposes.

The lithographic plate of the present invention is inexpensive and easy to prepare. There can be rapid hydrolysis of the metal ester from the atmosphere without requiring the manual addition of water. Our lithographic plate is exceptionally clean running on a press and is particularly adapted for duplicator work or short press runs, that is, of about 5000 impressions or less.

Other forms embodying the features of the invention may be employed, change being made as regards the features herein disclosed, provided those stated by any of the following claims or the equivalent of such features be employed.

We therefore particularly point out and distinctly claim as our invention:

1. A process of bonding a light-sensitive material to a metal surface of a support member comprising hydroxylating the metal surface, coating the hydroxylated metal surface with a film of a solution of a metal ester in an organic solvent, the ester having the formula $(RO)_4M$, wherein R is a monovalent hydrocarbon radical selected from the group consisting of phenyl, tolyl, xylyl and aliphatic radicals having from 1 to 8 carbon atoms and M is a metal selected from the group consisting of titanium and zirconium, said solution containing sufficient metal ester to deposit an amount of such ester on said hydroxylated surface equivalent to that depoisted by contacting the plate with an about 0.1 to about 10 weight percent solution for a period of time up to approximately 5 minutes, hydrolyzing and condensing said ester on said hydroxylated metal surface while reacting said ester with the hydroxyl groups of the hydroxylated metal surface, said reaction product being hydrophilic, substantially free of oxides of M and substantially non-susceptible to further hydrolysis, and subsequently applying a layer of light-sensitive material over said reaction product.

2. The process of claim 1 wherein such metal ester is tetraisopropyl titanate.

3. The process of claim 1 wherein such hydroxylating step includes treating the metallic surface with an agent selected from the group consisting of ammonium hydroxide, sodium hydroxide, potassium hydroxide, ethanolamine, diethanolamine, triethanolamine, and water.

4. The process of claim 1 wherein such organic solvent is hygroscopic to absorb moisture from the ambient atmosphere and assist in such hydrolyzing step.

5. The improvement of claim 1 wherein the metal of said metal-surfaced support member is selected from the group consisting of aluminum and zinc.

6. The improvement of claim 1 wherein said light-sensitive layer consists essentially of a light-sensitive diazo compound.

7. The improvement of claim 1 wherein such hydroxylating step includes placing said support member with a metal surface in boiling water for about 5 minutes to about 15 minutes.

8. A process as claimed in claim 1 further including the steps of exposing predetermined areas of said light-sensitive compound to light, and then removing from the plate selected areas of such light-sensitive compound to render the plate ready for printing.

9. The process of claim 1 wherein the solution of metal ester in organic solvent contains from about 0.1 to about 10 weight percent of such ester.

10. A lithographic plate comprising a hydroxylated metal surfaced support member, a light-sensitive coating over said support member, and a hydrophilic intermediate layer between said hydroxylated metal surface and said light-sensitive coating, said intermediate layer being the reaction product of the hydroxylated metal surface and a metal ester having the formula $(RO)_4M$, wherein R is a monovalent hydrocarbon radical selected from the group consisting of phenyl, tolyl, xylyl and aliphatic radicals having from 1 to 8 carbon atoms, and M is a metal selected from the group consisting of titanium and zirconium, said reaction product being hydrophilic, substantially free of oxides of M and substantially non-susceptible to further hydrolysis.

11. The lithographic plate of claim 10 wherein said light-sensitive layer comprises a light-sensitive diazo compound reactive to light to define printing areas of said plate.

12. The lithographic plate of claim 10 wherein the metal of said metal-surfaced support member is selected from the group consisting of aluminum and zinc.

13. The lithographic plate of claim 10 wherein said metal ester is tetraisopropyl titanate.

References Cited by the Examiner

UNITED STATES PATENTS

| | | | |
|---|---|---|---|
| 2,147,778 | 2/1939 | Rubinstein | 101—149.2 X |
| 2,766,688 | 10/1956 | Halpern et al. | 101—149.2 |
| 2,768,907 | 10/1956 | Lusby | 117—70 |
| 2,785,098 | 3/1957 | Cunningham et al. | 148—6.27 |
| 2,811,426 | 10/1957 | Mason | 101—149.2 X |
| 2,983,221 | 5/1961 | Dalton et al. | 101—149.2 |
| 3,061,483 | 10/1962 | Coles et al. | 148—6.14 |

DAVID KLEIN, *Primary Examiner.*

ROBERT A. LEIGHEY, WILLIAM B. PENN, *Examiners.*